S. W. MEREDITH.
Improvement in Cord Clamps.
No. 124,604. Patented March 12, 1872.
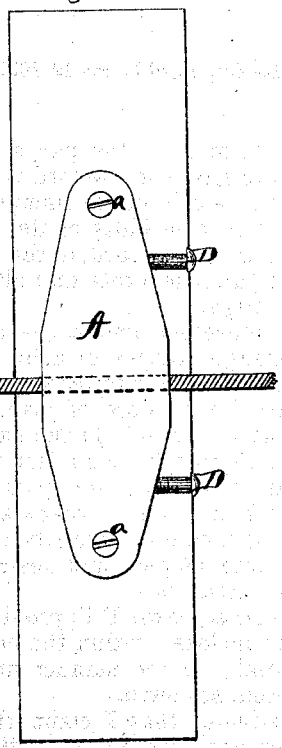
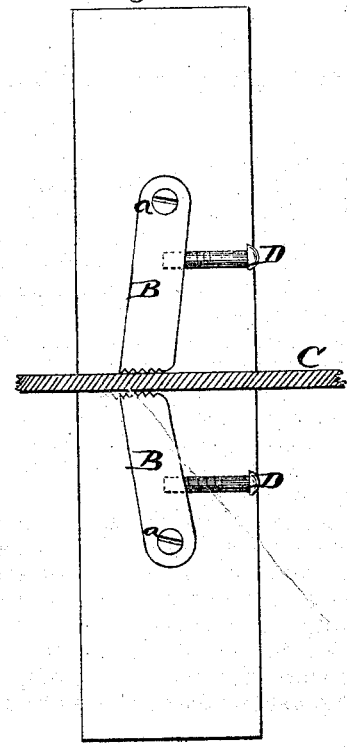
Witnesses:
Inventor
Samuel W. Meredith
Attorneys.

124,604

UNITED STATES PATENT OFFICE.

SAMUEL W. MEREDITH, OF GREENSBURG, INDIANA, ASSIGNOR TO HIMSELF AND IRVIN ROBBINS, OF SAME PLACE.

IMPROVEMENT IN CORD-CLAMPS.

Specification forming part of Letters Patent No. 124,604, dated March 12, 1872.

*To all whom it may concern:*

Be it known that I, SAMUEL W. MEREDITH, of Greensburg, in the county of Decatur and in the State of Indiana, have invented certain new and useful Improvements in Cord-Clamp; and do hereby declare that the following is a full, clear, and exact description thereof, reference being had to the accompanying drawing and to the letters of reference marked thereon making a part of this specification.

The nature of my invention consists in the construction and arrangement of a cord-clamp to be used for any purpose where it is necessary to clamp or hold a cord.

In order to enable others skilled in the art to which my invention appertains to make and use the same, I will now proceed to describe its construction and operation, referring to the annexed drawing, in which—

Figure 1 is a side view of the clamp. Fig. 2 is a similar view with the outer casing removed, and Fig. 3 shows the edge of said outer casing.

A represents a box or casing, of any suitable dimensions attached to the place where the cord-clamp is to be used, by means of a screw, *a*, through each end. These screws also pass through the outer ends of two pawls, B B, thus pivoting the same within the box or casing. The inner ends of these pawls are toothed, as shown in Fig. 2, so as to clamp the cord C when they are brought together in the same.

The operation of the pawls is readily seen. When the strain on the cord C is in one direction it will be held firmly clamped by the pawls without the possibility of its escaping, while by pulling on the cord in the opposite direction the pawls separate and allow the cord to pass through.

D D represent knobs, the stems of which pass through notches or holes *b b* in the edge of the casing A, and are screwed into the pawls B B, for the purpose of placing the fingers upon said knobs to hold the pawls away from the cord to prevent their clamping when it is necessary to run the cord backward in the direction when it would otherwise be clamped.

Having thus fully described my invention, what I claim as new, and desire to secure by Letters Patent, is—

The toothed pawls B B, provided with knobs D D and inclosed within the box or casing A, substantially in the manner and for the purpose herein set forth.

In testimony that I claim the foregoing I have hereunto set my hand this 19th day of December, 1871.

SAMUEL W. MEREDITH.

Witnesses:
JAMES GAINS,
MARINE D. JACKETT.